(12) United States Patent
Murata et al.

(10) Patent No.: US 10,704,494 B2
(45) Date of Patent: Jul. 7, 2020

(54) HEAT RECOVERY STRUCTURE

(71) Applicants: TOYOTA JIDOSHA KABUSHIKI KAISHA, Toyota-shi (JP); SANGO Co., LTD., Miyoshi (JP)

(72) Inventors: Toshio Murata, Toyota (JP); Koji Ichikawa, Okazaki (JP)

(73) Assignees: TOYOTA JIDOSHA KABUSHIKI KAISHA, Toyota-shi (JP); SANGO Co., LTD., Miyoshi (JP)

( * ) Notice: Subject to any disclaimer, the term of this patent is extended or adjusted under 35 U.S.C. 154(b) by 0 days.

(21) Appl. No.: 16/021,675

(22) Filed: Jun. 28, 2018

(65) Prior Publication Data

US 2019/0032599 A1    Jan. 31, 2019

(30) Foreign Application Priority Data

Jul. 25, 2017   (JP) ................. 2017-143371

(51) Int. Cl.
   *F01N 5/02*   (2006.01)
   *F02G 5/00*   (2006.01)
   (Continued)

(52) U.S. Cl.
   CPC ............. *F02G 5/04* (2013.01); *F01N 5/02* (2013.01); *F01N 13/18* (2013.01); *F02G 5/02* (2013.01);
   (Continued)

(58) Field of Classification Search
   CPC .. F01N 13/18; F01N 2240/02; F01N 2410/00; F01N 5/02; F01P 2060/10; F02G 5/02; F02G 5/04
   See application file for complete search history.

(56) References Cited

U.S. PATENT DOCUMENTS

2008/0066886 A1*  3/2008  Mabuchi .............. B60K 13/04
                                                     165/67
2010/0043413 A1*  2/2010  Orihashi .................. F01N 3/02
                                                     60/320
(Continued)

FOREIGN PATENT DOCUMENTS

CN    101134433 A    3/2008
JP    2014-95362     5/2014
JP    2016-121557    7/2016

*Primary Examiner* — Phutthiwat Wongwian
*Assistant Examiner* — Diem T Tran
(74) *Attorney, Agent, or Firm* — Oblon, McClelland, Maier & Neustadt, L.L.P.

(57) ABSTRACT

A heat recovery structure includes a pipe portion, a heat exchanging portion and an actuator. The pipe portion is inclined such that a side face of the pipe portion faces a diagonally lower side, and is configured such that exhaust gas from an engine circulates through the pipe portion. The heat exchanging portion is configured to communicate with the pipe portion and to perform heat-exchange between a heat medium and the exhaust gas flowing into the heat exchanging portion from the pipe portion such that the exhaust gas thus subjected to the heat-exchange with the heat medium flows out to the pipe portion. The actuator is configured to operate a selector valve configured to switch between a state where the exhaust gas circulates through the pipe portion and a state where the exhaust gas circulates through the heat exchanging portion.

5 Claims, 6 Drawing Sheets

(51) Int. Cl.
*F01N 13/18* (2010.01)
*F02G 5/04* (2006.01)
*F02G 5/02* (2006.01)

(52) U.S. Cl.
CPC ...... *F01N 2240/02* (2013.01); *F01N 2410/00* (2013.01); *F01P 2060/10* (2013.01)

(56) References Cited

U.S. PATENT DOCUMENTS

2011/0131961 A1* 6/2011 Lee .................. F01M 5/001
60/320
2016/0186625 A1 6/2016 Oya et al.

* cited by examiner

HEAT RECOVERY STRUCTURE

CROSS-REFERENCE TO RELATED APPLICATIONS

The disclosure of Japanese Patent Application No. 2017-143371 filed on Jul. 25, 2017 including the specification, drawings and abstract is incorporated herein by reference in its entirety.

BACKGROUND

1. Technical Field

The disclosure relates to a heat recovery structure.

2. Description of Related Art

Japanese Unexamined Patent Application Publication No. 2014-095362 (JP 2014-095362 A) describes a heat recovery system including an exhaust-pipe portion into which exhaust gas is discharged, a heat recovery device branched from the exhaust-pipe portion and provided above the exhaust-pipe portion so as to perform heat-exchange between the exhaust gas and a cooling medium, a cooling pipe through which the cooling medium is introduced into the heat recovery device, and an actuator provided on a lateral side of the exhaust-pipe portion and configured to drive a selector valve that changes a passage for the exhaust gas introduced into the exhaust-pipe portion between the exhaust-pipe portion and the heat recovery device. In the heat recovery system, the cooling pipe is provided between the actuator and the heat recovery device.

SUMMARY

In the heat recovery system in JP 2014-095362 A, the cooling pipe is provided between the actuator and the heat recovery device, so that the atmospheric temperature around the actuator is decreased by the cooling medium, so as to prevent the actuator from receiving heat damage due to radiant heat from the exhaust gas. However, there is room for improvement in restraining the actuator from receiving heat damage.

In consideration of the above fact, the disclosure provides a heat recovery structure that is able to restrain an actuator from receiving heat damage.

In view of this, one aspect of the disclosure provides a heat recovery structure including a pipe portion, a heat exchanging portion, and an actuator. The pipe portion is placed inside a floor tunnel provided on a vehicle floor, the floor tunnel being opened on a lower side. The pipe portion is inclined such that a side face of the pipe portion faces a diagonally lower side and the pipe portion is configured such that exhaust gas from an engine circulates through the pipe portion. The heat exchanging portion is placed above the pipe portion inside the floor tunnel and configured to communicate with the pipe portion. The heat exchanging portion is configured to perform heat-exchange between a heat medium and the exhaust gas flowing into the heat exchanging portion from the pipe portion such that the exhaust gas thus subjected to the heat-exchange with the heat medium flows out to the pipe portion. The actuator is placed inside the floor tunnel so as to face the side face of the pipe portion. The actuator is configured to operate a selector valve configured to switch between a state where the exhaust gas circulates through the pipe portion and a state where the exhaust gas circulates through the heat exchanging portion.

In the heat recovery structure according to one aspect of the disclosure, at least a part of the heat exchanging portion may be placed above the pipe portion.

Note that the "side face" of the pipe portion is a surface placed on the right or left side (a lateral side) when a circulation direction of the exhaust gas is along the front-rear direction. The "configuration in which the heat exchanging portion is placed above the pipe portion" includes a configuration in which at least a part of the heat exchanging portion is placed at a position higher than the pipe portion. That is, when at least a part of the heat exchanging portion is placed at a position higher than the pipe portion, the configuration corresponds to the "configuration in which the heat exchanging portion is placed above the pipe portion." The "configuration in which the actuator faces the side face" includes a configuration in which at least a part of the actuator is placed on the diagonally lower side (in a vertical direction to the side face) that the side face faces. That is, when at least a part of the actuator is positioned on the diagonally lower side (in the vertical direction to the side face) that the side face faces, the configuration corresponds to the "configuration in which the actuator faces the side face." Further, the "side face" and the "direction including the up-down direction (height direction)" in claims are concepts in a state where constituent parts (the pipe portion, the heat exchanging portion, and the actuator) of the heat recovery structure are placed inside the floor tunnel provided on the vehicle floor (that is, a state where they are provided in the vehicle).

In the heat recovery structure according to the configuration described above, when the selector valve is operated by the actuator to cause the state where the exhaust gas circulates through the pipe portion, the exhaust gas from the engine circulates through the pipe portion. When the selector valve is operated by the actuator so as to switch to the state where the exhaust gas circulates through the heat exchanging portion, the exhaust gas flows from the pipe portion into the heat exchanging portion placed above the pipe portion or at least partially placed above the pipe portion. In the heat exchanging portion, heat-exchange is performed between the heat medium and the exhaust gas flowing therein from the pipe portion, and the exhaust gas thus subjected to the heat-exchange with the heat medium flows out to the pipe portion.

Here, since the lower side of the floor tunnel is opened, travel wind generated at the time when the vehicle runs easily comes inside the floor tunnel from the lower side. In the heat recovery structure according to one aspect of the disclosure, the pipe portion is inclined such that the side face faces the diagonally lower side. Hereby, in comparison with the configuration in which the side face of the pipe portion faces a lateral side (just beside the side face), travel wind coming inside the floor tunnel from below easily hits the side face of the pipe portion. On this account, the side face can be effectively cooled off by the travel wind thus coming inside the floor tunnel from below. Accordingly, radiant heat from the pipe portion can be hardly transmitted to the actuator, thereby making it possible to restrain the actuator from receiving heat damage.

Further, since the actuator is placed so as to face the side face facing the diagonally lower side, the actuator is placed on the diagonally lower side from the side face inside the floor tunnel. That is, in comparison with a configuration in which the side face of the pipe portion faces a lateral side (just beside the side face) and the actuator is placed at a position facing the side face, the actuator is placed at a relatively lower position inside the floor tunnel. On this account, travel wind coming inside the floor tunnel from below easily hits the actuator, so that the actuator can be cooled off effectively. This makes it possible to restrain the actuator from receiving heat damage.

Further, in the heat recovery structure, the heat exchanging portion may be inclined such that a side face placed on the same side as the side face of the pipe portion faces the diagonally lower side. The actuator may be placed so as to face the side face of the heat exchanging portion and the side face of the pipe portion.

In the heat recovery structure configured as described above, in comparison with the configuration in which the side face of the heat exchanging portion faces a lateral side (just beside the side face), travel wind coming inside the floor tunnel from below easily hits the side face of the heat exchanging portion. On this account, the side face can be effectively cooled off by the travel wind thus coming inside the floor tunnel from below. Accordingly, radiant heat from the heat exchanging portion can be hardly transmitted to the actuator, thereby making it possible to restrain the actuator from receiving heat damage.

Further, since the actuator is placed so as to face the side face of the heat exchanging portion and the side face of the pipe portion, the actuator is placed on the diagonally lower side from the side faces inside the floor tunnel. That is, in comparison with a configuration in which the side face of the heat exchanging portion and the side face of the pipe portion face a lateral side (just beside them) and the actuator is placed at a position facing the side faces, the actuator is placed at a relatively lower position inside the floor tunnel. On this account, travel wind coming inside the floor tunnel from below easily hits the actuator, so that the actuator can be cooled off effectively. This makes it possible to restrain the actuator from receiving heat damage.

Further, in the heat recovery structure, the height of a bottom most surface of the actuator may be equal to or lower than the height of a bottom most surface of the pipe portion.

Note that the "bottom most surface of the actuator" indicates a "surface at the lowest position" in the actuator. The "bottom most surface of the pipe portion" indicates a "surface at the lowest position" in the pipe portion. The "configuration in which the height of the bottom most surface of the actuator is equal to or lower than the height of the bottom most surface of the pipe portion" includes a "configuration in which the height of the bottom most surface of the actuator is the same as the height of the bottom most surface of the pipe portion" and a "configuration in which the height of the bottom most surface of the actuator is lower than the height of the bottom most surface of the pipe portion."

In the heat recovery structure configured as described above, the actuator is placed at a height equal to or lower than the height of the bottom most surface of the pipe portion. On this account, in comparison with a configuration in which the height of the bottom most surface of the actuator is higher than the height of the bottom most surface of the pipe portion, travel wind coming inside the floor tunnel from below easily hits the bottom most surface of the actuator, so that the actuator can be cooled off effectively. This makes it possible to restrain the actuator from receiving heat damage.

Further, the height of the bottom most surface of the actuator may be higher than the height of the bottom most surface of the pipe portion. Even in the heat recovery structure configured as described above, when the actuator is placed at a relatively lower position from the pipe portion, travel wind coming inside the floor tunnel from below easily hits the actuator, so that the actuator can be cooled off effectively.

Further, in the heat recovery structure, the heat exchanging portion and the pipe portion may be placed in an inclined manner such that the total length, in the height direction, of the heat exchanging portion and the pipe portion is shorter than the total length of the heat exchanging portion and the pipe portion along the side face of the pipe portion.

In the heat recovery structure configured as described above, in comparison with a configuration in which the heat exchanging portion and the pipe portion are placed so that the side face of the pipe portion is placed along the up-down direction, the total length, in the height direction, of the heat exchanging portion and the pipe portion becomes short. On this account, even when a space along the height direction inside the floor tunnel is small, it is possible to place the pipe portion and the heat exchanging portion therein.

Since the disclosure has the configuration described above, the disclosure has an excellent effect that can restrain the actuator from receiving heat damage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
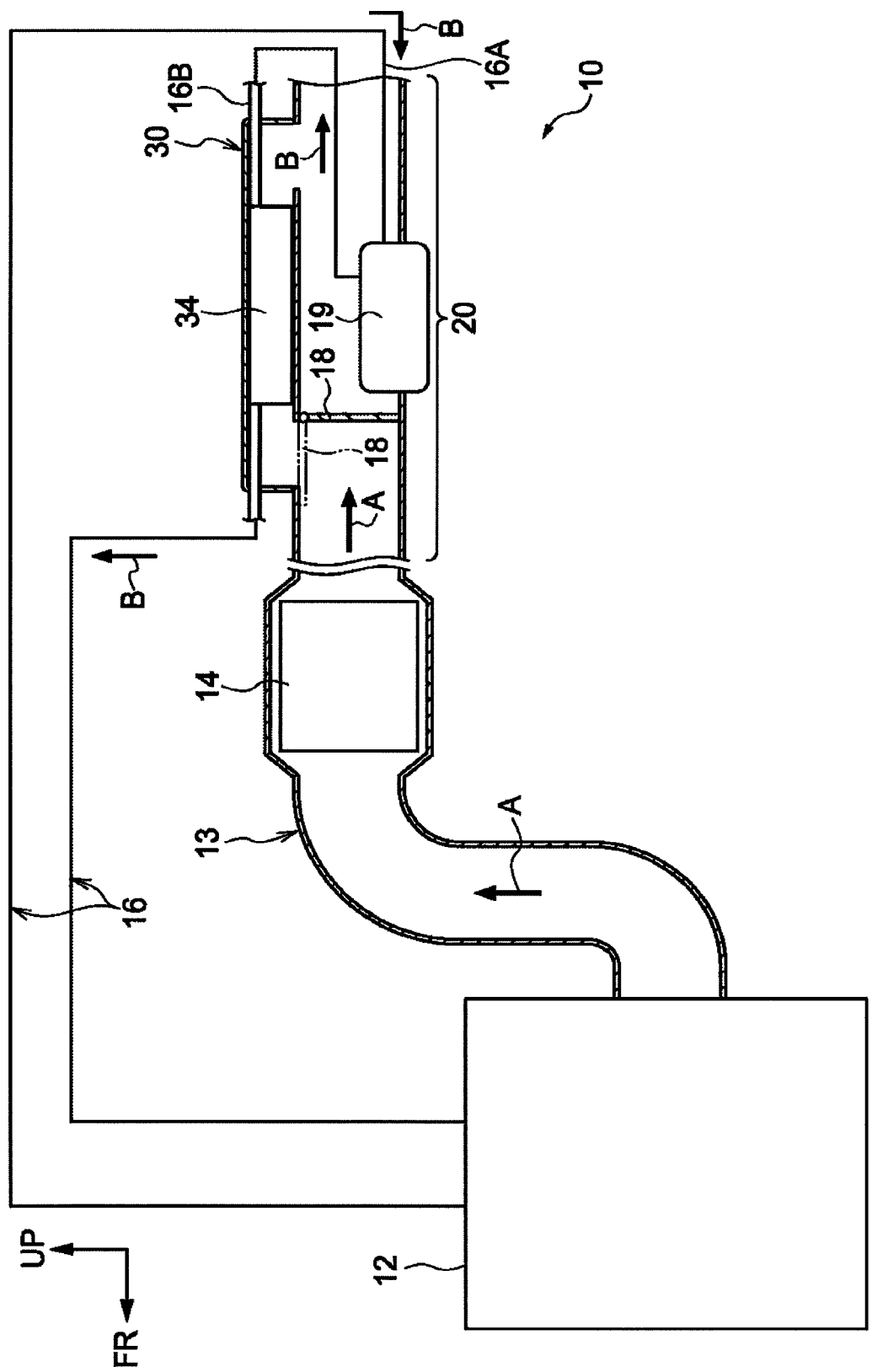
FIG. 1 is a view schematically illustrating the overall structure of a heat recovery structure according to the present embodiment.

One exemplary embodiment of the disclosure will hereinafter be described with reference to the drawings.

An arrow FR, an arrow RH, and an arrow UP illustrated appropriately in the drawings indicate the front side, the right side, and the upper side, respectively. Further, a front-rear direction, a right-left direction, and an up-down direction used in the following description are directions in a state where constituent parts of a heat recovery structure 10 are provided in a vehicle. Accordingly, the front-rear direction, the right-left direction, and the up-down direction used in the following description correspond to a front-rear direction, a right-left direction, and an up-down direction of a vehicle to which the heat recovery structure 10 is applied. Further, in the following description, an upstream side and a downstream side in a gas circulation direction of exhaust gas may be just referred to as an "upstream side" and a "downstream side," respectively.

The configuration of the heat recovery structure 10 according to the present embodiment will be described. FIG. 1 illustrates the heat recovery structure 10.

The heat recovery structure 10 is a structure that recovers heat of exhaust gas from an engine 12 of a vehicle such as an automobile by heat exchange with coolant (an example of a heat medium) in a heat exchanging portion 30 described later. The heat recovered in the heat recovery structure 10 is used for promoting warming-up of the engine 12, and the like, for example.

The heat recovery structure 10 more specifically includes an exhaust pipe 13, the heat exchanging portion 30, a selector valve 18, and an actuator 19, as illustrated in FIG. 1.

The exhaust pipe 13 is constituted by a cylindrical pipe extending along the front-rear direction. The front end of the exhaust pipe 13 is connected to the engine 12. Hereby, exhaust gas from the engine 12 flows into the exhaust pipe 13 from its front end and circulates toward the rear side. In each drawing, the gas circulation direction in which the exhaust gas circulates is indicated as an arrow-A direction appropriately.

The exhaust pipe 13 includes a cylindrical pipe portion 20 serving as a part of the pipe. A catalytic converter 14 is provided on the upstream side of the pipe portion 20 in the exhaust pipe 13. The catalytic converter 14 has a function to remove a specific substance from exhaust gas passing through the catalytic converter 14 so as to clean the exhaust gas.

Figure 3:
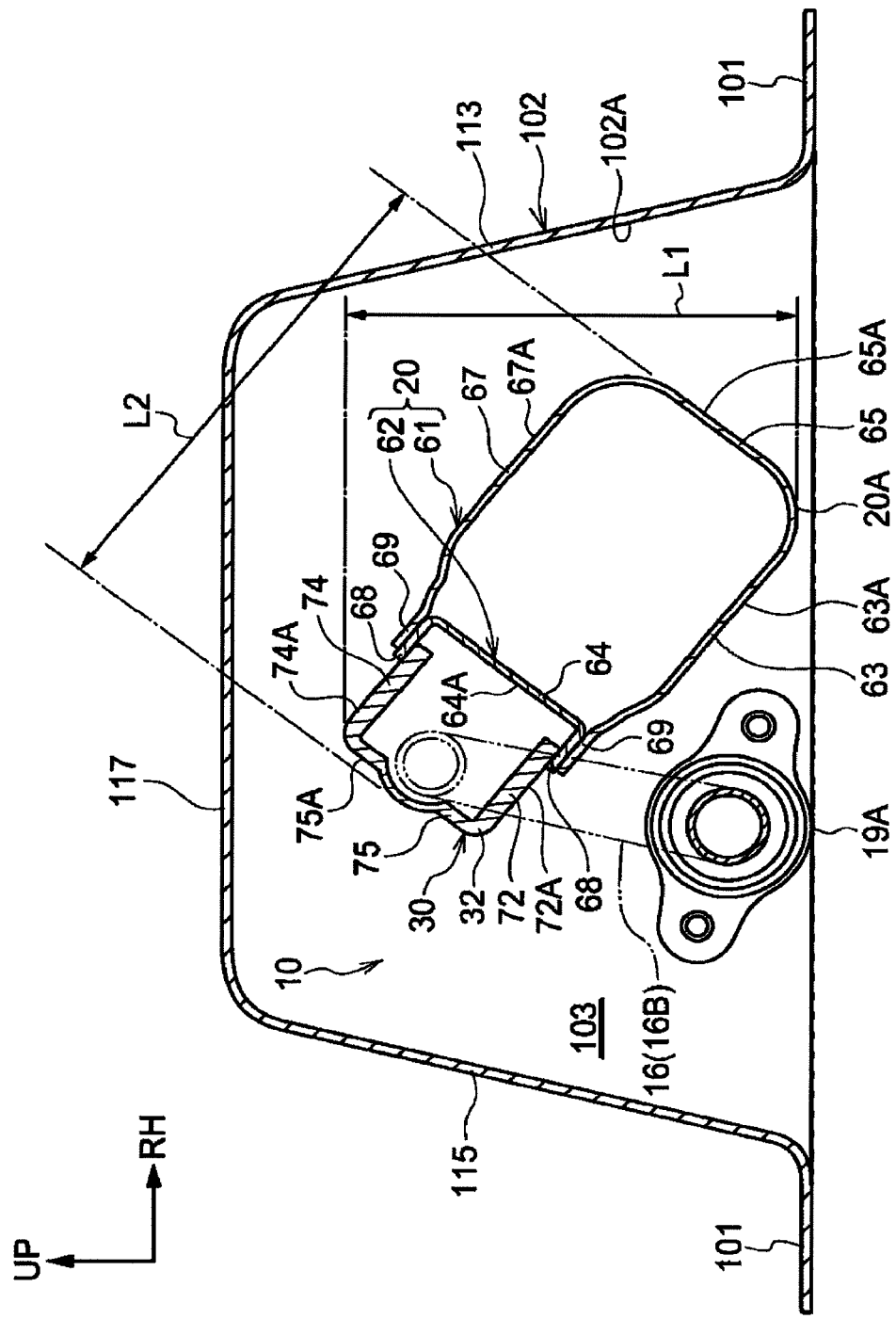
FIG. 3 is a front sectional view schematically illustrating the heat recovery structure according to the present embodiment.

The pipe portion 20 is provided cylindrically such that a plurality of separate members (e.g., two separate members) is joined by welding or the like, as an example. More specifically, the pipe portion 20 includes a first member 61 having a left side wall 63, a bottom wall 65, and a right side wall 67, and a second member 62 having an upper wall 64 as illustrated in FIG. 3.

The first member 61 includes a joining portion 69 extending upward (toward the diagonally upper left side) from the upper ends of the left side wall 63 and the right side wall 67. The second member 62 includes a joining portion 68 extending upward (toward the diagonally upper left side) from the left end and the right end of the upper wall 64. The joining portion 68 is joined to the joining portion 69 so that the pipe portion 20 is provided cylindrically.

The upper wall 64 also functions as a wall that partitions the heat exchanging portion 30 from the pipe portion 20. Accordingly, the upper wall 64 is an upper wall for the pipe portion 20 and also functions as a bottom wall for a tube portion 32 (described later) of the heat exchanging portion 30.

Note that the exterior shape of the pipe portion 20 is provided in a generally rectangular shape as an example. Further, in the pipe portion 20, the exhaust gas circulates toward the rear side. That is, the exhaust gas circulates from the depth side to the near side on the plane of paper in FIG. 3.

Figure 4:
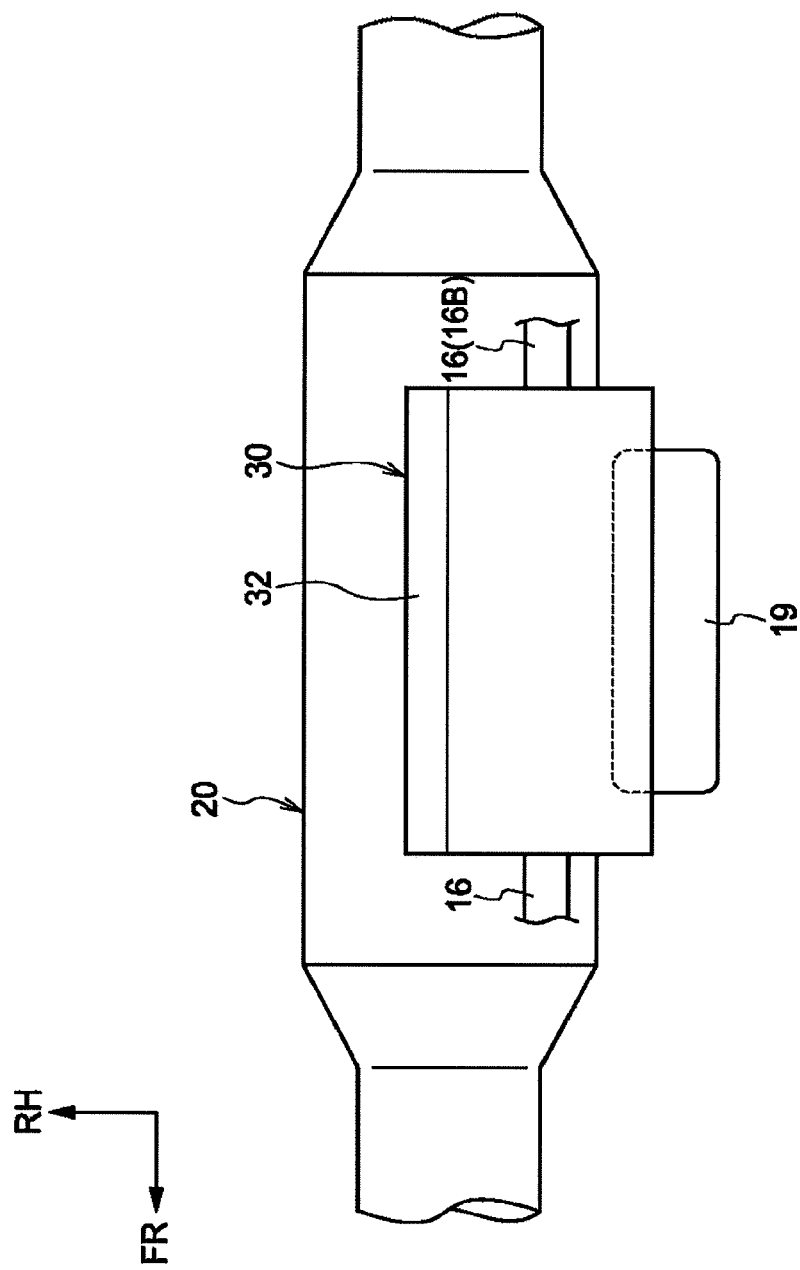
FIG. 4 is a plan view schematically illustrating the heat recovery structure according to the present embodiment.

The heat exchanging portion 30 has a function to perform heat-exchange between the exhaust gas and the coolant (an example of the heat medium). The heat exchanging portion 30 is placed on the diagonally upper left side from the pipe portion 20 as illustrated in FIGS. 3 and 4. More specifically, the heat exchanging portion 30 includes the tube portion 32 placed on the diagonally upper left side of the pipe portion 20, and a heat exchanger 34 placed inside the tube portion 32.

Figure 2:
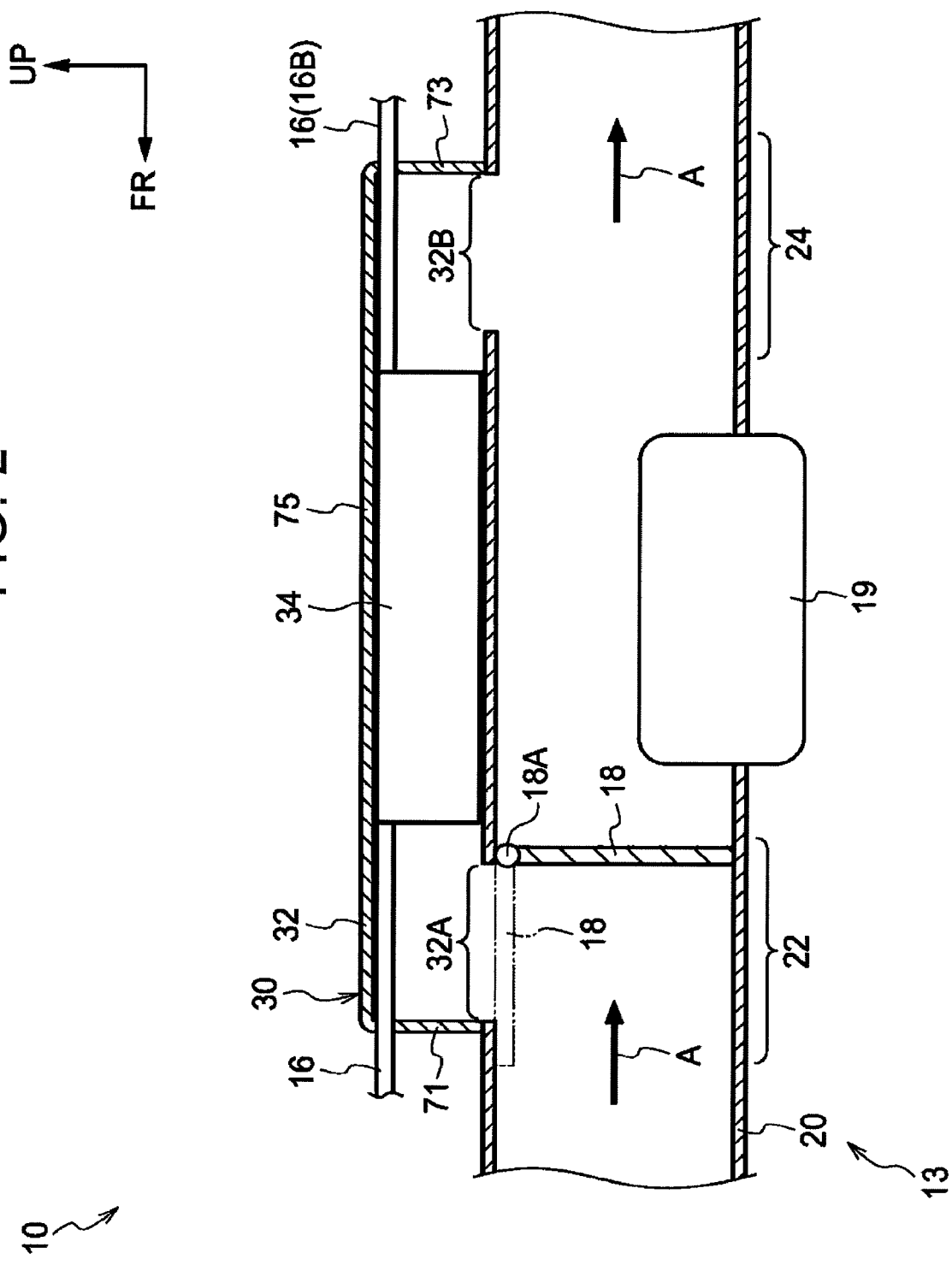
FIG. 2 is a side sectional view schematically illustrating the heat recovery structure according to the present embodiment.

The tube portion 32 includes a front wall 71 and a rear wall 73 as illustrated in FIG. 2. Further, the tube portion 32 includes a left side wall 72, a right side wall 74, and an upper wall 75 as illustrated in FIG. 3. The exterior shape of the tube portion 32 is provided in a generally rectangular shape as an example (see FIG. 3).

Further, as illustrated in FIG. 2, the tube portion 32 includes an inlet 32A via which the exhaust gas flows into the tube portion 32, and an outlet 32B via which the exhaust gas flows out from the inside of the tube portion 32. The inlet 32A and the outlet 32B of the tube portion 32 communicate with an upstream portion 22 and a downstream portion 24 in the pipe portion 20 of the exhaust pipe 13, respectively. Hereby, the tube portion 32 is connected to the pipe portion 20 in parallel, so as to constitute an exhaust passage detouring around the pipe portion 20.

The heat exchanger 34 is placed at an intermediate position inside the tube portion 32 in the gas circulation direction, as illustrated in FIG. 2. The heat exchanger 34 is provided with a gas passage (not shown) provided in a penetrating manner in the front-rear direction so as to circulate the exhaust gas therethrough.

Further, a coolant circulation passage 16 for circulating the coolant between the inside of the heat exchanger 34 and the engine 12 is connected to the heat exchanger 34. Due to operation of a water pump (not shown) driven by power of the engine 12, the coolant is circulated through the coolant circulation passage 16 as illustrated in FIG. 1 (in FIG. 1, the flow of the coolant is indicated by an arrow B). Hereby, the heat exchanger 34 performs heat-exchange between the exhaust gas and the coolant so that the coolant recovers heat of the exhaust gas, so as to use the heat for promotion of warming-up of the engine 12, and the like.

As illustrated in FIG. 2, the coolant circulation passage 16 penetrates through the front wall 71 and the rear wall 73 of the tube portion 32. Further, the coolant circulation passage 16 is configured to circulate the coolant between the inside of the heat exchanger 34 and the engine 12 via an actuator 19 (a thermoactuator).

Note that, for example, right after the engine 12 is started or when the engine 12 is stopped by turning off an ignition switch of an automobile, the coolant is not circulated through the coolant circulation passage 16. Further, for example, in the case where the heat recovery structure 10 is applied to a hybrid automobile, when the engine 12 stops due to intermittent operation of the engine 12, the coolant is not circulated through the coolant circulation passage 16.

With such a configuration, the heat exchanging portion 30 performs heat-exchange between the coolant and the exhaust gas flowing therein via the inlet 32A from the pipe portion 20 of the exhaust pipe 13, and the exhaust gas thus subjected to the heat-exchange with the coolant flows out to the pipe portion 20 via the outlet 32B (see FIG. 2).

As illustrated in FIG. 2, the upstream portion 22 of the pipe portion 20 is provided with the selector valve 18 configured to switch between a state where the exhaust gas circulates through the pipe portion 20 of the exhaust pipe 13 and a state where the exhaust gas circulates through the heat exchanging portion 30 (the tube portion 32). The selector valve 18 is supported by the pipe portion 20 so as to be rotatable (swingable) between a position at which the passage of the pipe portion 20 is closed (a position indicated by a continuous line in FIG. 2) and a position at which a part between the pipe portion 20 and the inlet 32A is closed (a position indicated by an alternate long and two short dashes line in FIG. 2).

Figure 5:
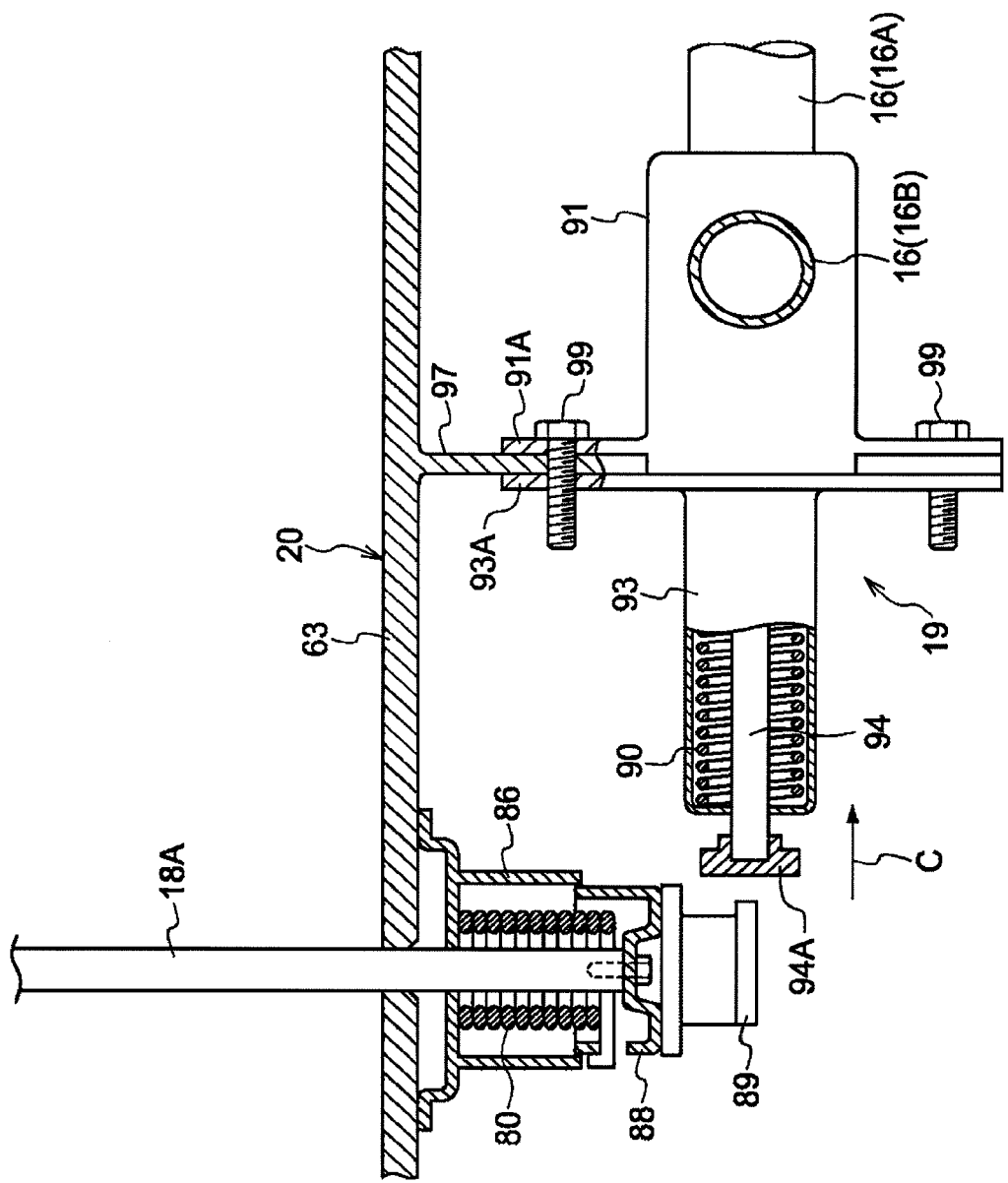
FIG. 5 is a plan sectional view schematically illustrating an actuator provided in the heat recovery structure according to the present embodiment.

As illustrated in FIG. 5, a first end of a rotating shaft 18A of the selector valve 18 penetrates through the left side wall 63 of the pipe portion 20 so as to project outside the pipe portion 20. A cam holding member 88 that holds a cam 89 is fixed to the first end of the rotating shaft 18A. The cam 89 is rotationally driven by an actuator 19.

Further, a coil spring 80 is provided on the outer periphery of the first end of the rotating shaft 18A, and the coil spring 80 is accommodated in a spring housing case 86 attached to the left side wall 63 of the pipe portion 20. The first end of the coil spring 80 is fixed to the spring housing case 86 and a second end of the coil spring 80 is fixed to the cam holding member 88.

The coil spring 80 biases the selector valve 18 toward the position at which the passage of the pipe portion 20 is closed (the position indicated by the continuous line in FIG. 2), as an example. Accordingly, the selector valve 18 is placed at the position at which the passage of the pipe portion 20 is closed (the position indicated by the continuous line in FIG. 2) as an initial position.

As the actuator 19, a thermoactuator driven depending on the temperature of the coolant is used. More specifically, the actuator 19 is configured as follows as an example.

As illustrated in FIG. 5, the actuator 19 includes a housing 91, a cylindrical member 93, a rod 94, and a coil spring 90. The actuator 19 is placed in the middle of a path (more specifically, a path from the engine 12 to the heat exchanger 34) of the coolant circulation passage 16, and the coolant circulates inside the housing 91.

The housing 91 is provided in a cylindrical shape having an opening in its axial first end, and a flange portion 91A projecting radially outwardly is provided in the axial first end. A thermoelement in which a temperature-sensing member such as a thermowax (not shown) is accommodated is provided inside the housing 91.

A first passage 16A (flow tube) through which the coolant circulates from the engine 12 side communicates with (is connected to) an axial second end of the housing 91. A first end of a second passage 16B (flow tube) circulating the coolant from the housing 91 to the heat exchanging portion 30 (the heat exchanger 34) communicates with (is connected to) the upper part of the housing 91. A second end of the second passage 16B (flow tube) penetrates through the rear wall 73 of the tube portion 32 so as to communicate with (be connected to) the heat exchanger 34. The first passage 16A and the second passage 16B serve as a part of the coolant circulation passage 16.

The cylindrical member 93 is provided in a cylindrical shape having an opening in its axial first end, and a flange portion 93A projecting radially outwardly is provided in the axial first end. An open end portion of the cylindrical member 93 communicates with an open end portion of the housing 91. The rod 94 is placed inside the cylindrical member 93 coaxially to the cylindrical member 93, and a front end thereof penetrates through an axial second end of the cylindrical member 93.

A pressing portion 94A for pressing the cam 89 is fixed to the front end of the rod 94. The thermoelement provided inside the housing 91 makes contact with the rear end of the rod 94. The coil spring 90 is placed on the outer periphery of the rod 94 and biases the rod 94 in a direction (an arrow-C direction) where the rod 94 is accommodated in the cylindrical member 93.

In the actuator 19, the coolant circulates around the thermoelement, and when the temperature of the coolant reaches a predetermined temperature set in advance, the thermowax of the thermoelement expands to press the rod 94. Hereby, when the pressing portion 94A fixed to the front end of the rod 94 presses the cam 89 and the rotating shaft 18A rotates against the biasing force of the coil spring 80 as indicated by an alternate long and two short dashes line in FIG. 6, the selector valve 18 is moved to the position at which a part between the pipe portion 20 and the inlet 32A is closed (the position indicated by the alternate long and two short dashes line in FIG. 2). Hereby, the exhaust gas circulates through the pipe portion 20 of the exhaust pipe 13.

Figure 6:
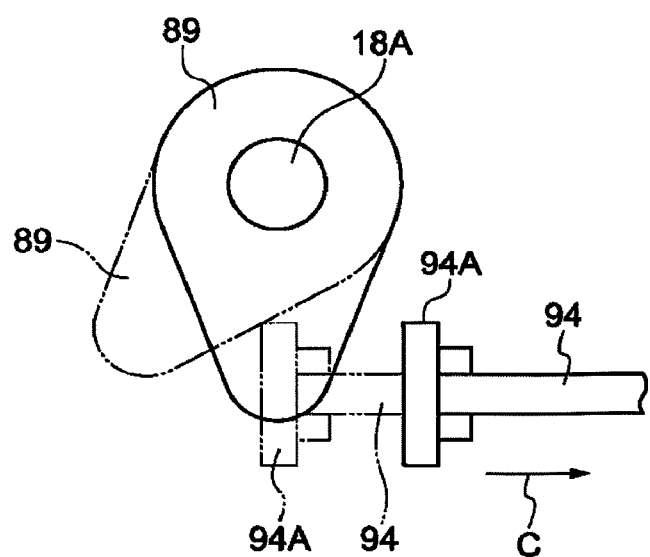
FIG. 6 is an operation diagram of a cam operated by the actuator provided in the heat recovery structure according to the present embodiment.

Further, when the temperature of the coolant becomes less than the predetermined temperature, the thermowax of the thermoelement is contracted, so that the rod 94 is biased by the coil spring 90 so as to move in the arrow-C direction as indicated by a continuous line in FIG. 6. Hereby, the rotating shaft 18A is rotated by the biasing force of the coil spring 80, so that the selector valve 18 moves to the position at which the passage of the pipe portion 20 is closed (the position indicated by the continuous line in FIG. 2).

When the rotating shaft 18A is rotated by the actuator 19 as described above, the selector valve 18 is operated.

Note that the actuator 19 is attached to a bracket 97 provided in the left side wall 63 of the pipe portion 20 as illustrated in FIG. 5. More specifically, the flange portion 91A of the housing 91 and the flange portion 93A of the cylindrical member 93 are fastened to the bracket 97 with fastening members 99. Further, a resin material is used for a receiving portion and so on for the rod 94 in the actuator 19. In FIGS. 1, 2, and 4, the actuator 19 is illustrated schematically.

In the present embodiment, the tube portion 32, the pipe portion 20, and the actuator 19 are placed inside a floor tunnel 102 provided in a floor panel 101 (an example of a vehicle floor). The floor tunnel 102 includes a right side wall 113, a left side wall 115, and an upper wall 117, and the lower side of the floor tunnel 102 is opened. The right side wall 113, the left side wall 115, and the upper wall 117 are extended in the front-rear direction. More specifically, the tube portion 32, the pipe portion 20, and the actuator 19 are placed in a space 103 surrounded by an inner peripheral surface 102A of the right side wall 113, the left side wall 115, and the upper wall 117 of the floor tunnel 102.

Here, in the present embodiment, the pipe portion 20 is placed in an inclined manner so that a side face 63A (an outer surface) of the left side wall 63 faces the diagonally lower left side inside the floor tunnel 102, as illustrated in FIG. 3.

As a result, a side face 67A (an outer surface) of the right side wall 67 of the pipe portion 20 faces the diagonally upper right side inside the floor tunnel 102. Further, a bottom face 65A (an outer surface) of the bottom wall 65 of the pipe portion 20 faces the diagonally lower right side inside the floor tunnel 102. Further, a top face 64A (an outer surface) of the upper wall 64 of the pipe portion 20 faces the diagonally upper left side inside the floor tunnel 102.

Note that a "side face" of the pipe portion 20 is a surface placed on the right or left side (a lateral side) when the gas circulation direction is along the front-rear direction. Further, in the present embodiment, for purposes of this description, the walls of the pipe portion 20 have been described as the upper wall 64, the left side wall 63, the bottom wall 65, and the right side wall 67, but the right, left, up, and down of the walls of the pipe portion 20 are not limited to this. For example, the bottom wall 65 may be regarded as a side wall, and the bottom face 65A may be regarded as a side face facing a diagonally lower side.

Further, in the present embodiment, the heat exchanging portion 30 (the tube portion 32) is placed on the diagonally upper left side from the pipe portion 20. The tube portion 32 is placed in an inclined manner so that a side face 72A (an outer surface) of the left side wall 72 faces the diagonally lower left side inside the floor tunnel 102.

As a result, a side face 74A (an outer surface) of the right side wall 74 of the tube portion 32 faces the diagonally upper right side inside the floor tunnel 102. Further, a top face 75A (an outer surface) of the upper wall 75 of the tube portion 32 faces the diagonally upper left side inside the floor tunnel 102.

Further, the heat exchanging portion 30 (the tube portion 32) and the pipe portion 20 are placed in an inclined manner so that the total length L1, in the height direction, of the heat exchanging portion 30 (the tube portion 32) and the pipe portion 20 is shorter than the total length L2 of the heat exchanging portion 30 (the tube portion 32) and the pipe portion 20 along the side face 63A of the left side wall 63 of the pipe portion 20.

The actuator 19 is placed inside the floor tunnel 102 so as to face the side face 63A of the left side wall 63 of the pipe portion 20 and the side face 72A of the left side wall 72 of the tube portion 32. Note that a "configuration in which the actuator 19 faces the side faces" includes a configuration in which at least a part of the actuator 19 is placed at a position on a diagonally lower side (in the vertical direction to the side faces) that the side faces face. That is, when at least a part of the actuator 19 is placed at a position on a diagonally lower side (in the vertical direction to the side faces) that the side faces face, the configuration corresponds to the configuration in which the actuator 19 faces the side faces.

Further, the actuator 19 is configured such that the height of a bottom most surface 19A is lowered than the height of a bottom most surface 20A of the pipe portion 20. The bottom most surface 20A of the pipe portion 20 is the outer surface of a boundary portion between the left side wall 63 and the bottom wall 65. Note that the "bottom most surface 19A of the actuator 19" indicates a "surface at the lowest position" in the actuator 19. The "bottom most surface 20A of the pipe portion 20" indicates a "surface at the lowest position" in the pipe portion 20.

The actuator 19 is placed below the heat exchanging portion 30 (the tube portion 32). More specifically, as illustrated in FIG. 4, the actuator 19 is placed at a position below the heat exchanging portion 30 (the tube portion 32) so as to overlap therewith in a plan view.

Next will be described the effects of the present embodiment. In the heat recovery structure 10, when the temperature of the coolant becomes less than the predetermined temperature, the thermowax of the thermoelement of the actuator 19 is contracted, so that the rod 94 is biased by the coil spring 90 so as to move in the arrow-C direction as indicated by the continuous line in FIG. 6. Hereby, the rotating shaft 18A is rotated by the biasing force of the coil spring 80, so that the selector valve 18 moves to the position at which the passage of the pipe portion 20 is closed (the position indicated by the continuous line in FIG. 2).

As a result, the exhaust gas in the pipe portion 20 flows into the heat exchanging portion 30 (the tube portion 32) via the inlet 32A. The exhaust gas thus flowing into the heat exchanging portion 30 (the tube portion 32) is subjected to heat-exchange with the coolant in the heat exchanger 34. Hereby, heat of the exhaust gas is recovered. The exhaust gas thus subjected to the heat-exchange with the coolant flows out to the pipe portion 20 via the outlet 32B of the heat exchanging portion 30.

Here, since the lower side of the floor tunnel 102 is opened, travel wind generated at the time when the vehicle runs easily comes inside the floor tunnel 102 from below. In the heat recovery structure 10, the pipe portion 20 is placed in an inclined manner so that the side face 63A (the outer surface) of the left side wall 63 faces the diagonally lower left side inside the floor tunnel 102, as illustrated in FIG. 3.

Hereby, in comparison with a configuration in which the side face 63A of the pipe portion 20 faces the left side (just beside the side face 63A), travel wind coming inside the floor tunnel 102 from below easily hits the side face 63A of the pipe portion 20. On this account, the side face 63A can be effectively cooled off by the travel wind thus coming inside the floor tunnel 102 from below. Accordingly, radiant heat from the pipe portion 20 can be hardly transmitted to the actuator 19, thereby making it possible to restrain the actuator 19 from receiving heat damage.

Further, as illustrated in FIG. 3, the heat exchanging portion 30 (the tube portion 32) is placed in an inclined manner so that the side face 72A (the outer surface) of the left side wall 72 faces the diagonally lower left side inside the floor tunnel 102.

On this account, in comparison with a configuration in which the side face 72A of the heat exchanging portion 30 faces the left side (just beside the side face 72A), travel wind coming inside the floor tunnel 102 from below easily hits the side face 72A of the heat exchanging portion 30. On this account, the side face 72A can be effectively cooled off by the travel wind thus coming inside the floor tunnel 102 from below. Accordingly, radiant heat from the heat exchanging portion 30 can be hardly transmitted to the actuator 19, thereby making it possible to restrain the actuator 19 from receiving heat damage.

Further, since the actuator 19 is placed so as to face the side face 72A and the side face 63A facing the diagonally lower side, the actuator 19 is placed on the diagonally lower side from the side face 72A and the side face 63A inside the floor tunnel 102. That is, in comparison with a configuration in which the side face 72A and the side face 63A face the left side (just beside them) and the actuator 19 is placed at a position facing the side face 72A and the side face 63A, the actuator 19 is placed at a relatively lower position inside the floor tunnel 102. On this account, travel wind coming inside the floor tunnel 102 from below easily hits the actuator 19, so that the actuator 19 can be cooled off effectively. This makes it possible to restrain the actuator 19 from receiving heat damage.

Further, in the heat recovery structure 10, the bottom most surface 19A of the actuator 19 is placed at a position lower than the height of the bottom most surface 20A of the pipe portion 20. On this account, in comparison with a configuration in which the height of the bottom most surface 19A of the actuator 19 is equal to or higher than the height of the bottom most surface 20A of the pipe portion 20, travel wind coming inside the floor tunnel 102 from below easily hits the bottom most surface 19A of the actuator 19, so that the actuator 19 can be cooled off effectively. This makes it possible to restrain the actuator 19 from receiving heat damage.

Thus, in the heat recovery structure 10, the actuator 19 is placed at a lower position inside the floor tunnel 102. Because of this, a different in height between the heat exchanging portion 30 (the tube portion 32) and the actuator 19 is large. Hereby, even when the coolant boils in the heat exchanging portion 30 (the tube portion 32), boiling gas can hardly reach the actuator 19 through the coolant circulation passage 16 (the second passage 16B). This accordingly makes it possible to restrain the actuator 19 from receiving heat damage.

Thus, the actuator 19 is placed at a lower position inside the floor tunnel 102. Accordingly, even when the actuator 19 receives heat damage, the actuator 19 can be replaced easily by accessing the actuator 19 from the lower side to replace the actuator 19.

Further, in the heat recovery structure 10, the heat exchanging portion 30 (the tube portion 32) and the pipe portion 20 are placed in an inclined manner so that the total length L1, in the height direction, of the heat exchanging portion 30 (the tube portion 32) and the pipe portion 20 is shorter than the total length L2 of the heat exchanging portion 30 (the tube portion 32) and the pipe portion 20 along the side face 63A of the left side wall 63 of the pipe portion 20.

On this account, in comparison with a configuration in which the heat exchanging portion 30 and the pipe portion 20 are placed so that the side face 63A of the pipe portion 20 is placed along the up-down direction, the total length, in the height direction, of the heat exchanging portion 30 and the pipe portion 20 becomes short. On this account, even when a space along the height direction inside the floor tunnel 102 is small, it is possible to place the pipe portion 20 and the heat exchanging portion 30 therein.

Next will be described various modifications of the present embodiment. In the present embodiment, the heat exchanging portion 30 (the tube portion 32) is placed on the diagonally upper left side from the pipe portion 20. The disclosure is not limited to this, and the heat exchanging portion 30 (the tube portion 32) may be placed above the pipe portion 20. The "configuration in which the heat exchanging portion 30 is placed above the pipe portion 20" includes a configuration in which at least a part of the heat exchanging portion 30 is placed at a position higher than the pipe portion 20. That is, when at least a part of the heat exchanging portion 30 is placed at a position higher than the pipe portion 20, the configuration corresponds to the "configuration in which the heat exchanging portion 30 is placed above the pipe portion 20."

In the present embodiment, the side face 63A of the pipe portion 20 and the side face 72A of the tube portion 32 face the diagonally lower left side. However, the disclosure is not limited to this and may have a configuration in which at least the side face 63A of the pipe portion 20 faces the diagonally lower side.

In the present embodiment, the actuator 19 is placed inside the floor tunnel 102 so as to face the side face 63A of the left side wall 63 of the pipe portion 20 and the side face 72A of the left side wall 72 of the tube portion 32. However, the disclosure is not limited to this. The actuator 19 should be placed so as to face at least the side face 63A of the left side wall 63 of the pipe portion 20.

In the present embodiment, the side face 63A of the pipe portion 20 and the side face 72A of the tube portion 32 face the diagonally lower left side and the actuator 19 faces the side face 63A of the pipe portion 20 and the side face 72A of the tube portion 32. However, the disclosure is not limited to this. For example, at least the side face 67A out of the side face 67A of the pipe portion 20 and the side face 74A of the tube portion 32 may face the diagonally lower right side and the actuator 19 may be configured to be placed so as to face at least the side face 67A out of the side face 67A and the side face 74A.

In the present embodiment, a thermoactuator is used as the actuator 19, but the disclosure is not limited to this. For example, a solenoid, a motor, and the like may be used as the actuator 19.

In the present embodiment, the actuator 19 is configured such that the height of the bottom most surface 19A is lower than the height of the bottom most surface 20A of the pipe portion 20, but the disclosure is not limited to this. For example, the height of the bottom most surface 19A of the actuator 19 may be the same as the height of the bottom most surface 20A of the pipe portion 20. Further, the height of the bottom most surface 19A of the actuator 19 may be higher than the height of the bottom most surface 20A of the pipe portion 20.

Further, in the present embodiment, the coolant is used as the heat medium, but the disclosure is not limited to this. For example, ATF fluid, CTV fluid, and the like may be used as the heat medium, and fluids such as liquid or gas used for heat exchange can be applied widely.

The disclosure is not limited to the embodiment and modifications thereof, and various modifications, alterations, and improvements can be made within a range that does not deviate from the gist of the disclosure.

What is claimed is:

1. A heat recovery structure comprising:
   a pipe portion placed inside a floor tunnel provided on a vehicle floor, the floor tunnel having an opening being opened on a lower side, the pipe portion being inclined such that a side face of the pipe portion faces a diagonally lower side and faces the opening of the floor tunnel, and the pipe portion being configured such that exhaust gas from an engine circulates through the pipe portion;
   a heat exchanging portion placed above the pipe portion inside the floor tunnel and configured to communicate with the pipe portion, the heat exchanging portion being configured to perform heat-exchange between a heat medium and the exhaust gas flowing into the heat exchanging portion from the pipe portion such that the exhaust gas thus subjected to the heat-exchange with the heat medium flows out to the pipe portion; and
   an actuator placed inside the floor tunnel so as to face the side face of the pipe portion that faces the opening on the lower side of the floor tunnel, the actuator being configured to operate a selector valve configured to switch between a state where the exhaust gas circulates through the pipe portion and a state where the exhaust gas circulates through the heat exchanging portion.

2. The heat recovery structure according to claim 1, wherein at least a part of the heat exchanging portion is placed above the pipe portion.

3. The heat recovery structure according to claim 1, wherein:
   the heat exchanging portion is inclined such that a side face on the same side as the side face of the pipe portion faces the diagonally lower side; and
   the actuator is placed so as to face the side face of the heat exchanging portion and the side face of the pipe portion.

4. The heat recovery structure according to claim 1, wherein a height of a bottom most surface of the actuator is equal to or lower than a height of a bottom most surface of the pipe portion.

5. The heat recovery structure according to claim 1, wherein the heat exchanging portion and the pipe portion are placed in an inclined manner such that a total length, in a height direction, of the heat exchanging portion and the pipe portion is shorter than a total length of the heat exchanging portion and the pipe portion along the side face of the pipe portion.

* * * * *